United States Patent [19]
Roba

[11] Patent Number: 5,491,581
[45] Date of Patent: Feb. 13, 1996

[54] RARE EARTH DOPED OPTICAL FIBRE AMPLIFIERS

[75] Inventor: Giacomo S. Roba, Cogoleto, Italy

[73] Assignee: Pirelli Cavi S.p.A., Milan, Italy

[21] Appl. No.: 154,957

[22] Filed: Nov. 19, 1993

[30]   Foreign Application Priority Data

Dec. 14, 1992 [GB] United Kingdom .................. 9226024

[51] Int. Cl.$^6$ .................................................. H01S 3/06
[52] U.S. Cl. ........................... 359/341; 385/127; 372/6
[58] Field of Search ................................ 359/337, 341;
385/126, 127; 65/3.11; 264/1.5; 372/6

[56]   References Cited

U.S. PATENT DOCUMENTS

| | | |
|---|---|---|
| 4,302,074 | 11/1981 | Fleming et al. . |
| 4,339,173 | 7/1982 | Aggarwal et al. . |
| 4,358,181 | 11/1982 | Gulati et al. . |
| 4,413,882 | 11/1983 | Bailey et al. . |
| 4,664,473 | 5/1987 | Gannon . |
| 4,782,491 | 11/1988 | Sutzer ........................................ 372/39 |
| 4,820,018 | 4/1989 | Melman et al. . |
| 5,005,175 | 4/1991 | Desurvine et al. ........................ 372/6 |
| 5,027,079 | 6/1991 | Desuvire et al. ........................ 359/341 |
| 5,058,976 | 10/1991 | Giovanni et al. . |
| 5,119,460 | 6/1992 | Bruce et al. ............................. 385/142 |
| 5,148,510 | 9/1992 | Barrelle et al. ........................ 385/142 |

FOREIGN PATENT DOCUMENTS

| | | | |
|---|---|---|---|
| 0041864 | 12/1981 | European Pat. Off. ........ | G02B 5/172 |
| 3820217 | 12/1989 | Germany ...................... | C03C 13/04 |
| 2273389 | 6/1994 | United Kingdom . | |
| WO9113038 | 9/1991 | WIPO ............................ | C03C 13/04 |

OTHER PUBLICATIONS

Ghigo et al., 1986, "Opt. Fiber Charoc Standards", France Nov. 25, 1985, vol. 584, pp. 26, 32, abst. only provided.
Ghigo et al., CS Tech. Rep. (Italy), vol. 14, #2, pp. 93–98, Apr. 1986; abst only provided herewith.
Ghigo et al., OFCS Symp., Nov. 25, 1985, pp. 26–32 same as R above.
Patent Abstracts of Japan, vol. 16, No. 341 Jul. 1992.
Optical Fiber Communication Conference, Technical Digest Series vol. 5, Feb. 1992, New York, N.Y. pp. 148–149.

*Primary Examiner*—Nelson Moskowitz
*Attorney, Agent, or Firm*—Brooks Haidt Haffner & Delahunty

[57]   ABSTRACT

An optical amplifier which includes an optical fiber having an erbium doped core surrounded by cladding, a pump for pumping the fiber with pump light at a pump wavelength coupled to the fiber, input means for inputting a signal to be amplified to the amplifier and output means for outputting an amplified signal from the amplifier. The fiber has a NA higher than 0.2. The difference in the coefficient of thermal expansion of the core adjacent the core/cladding interface and the coefficient of thermal expansion of the cladding at at least one radius less than 2 μm from said interface is lower than a predetermined value, corresponding to a ratio of erbium loss to background loss, at said pump wavelength, and greater than a minimum ratio of about 20 when erbium loss is 0.15 dB/m and about 120 when erbium loss is 3.5 dB/m.

43 Claims, 5 Drawing Sheets

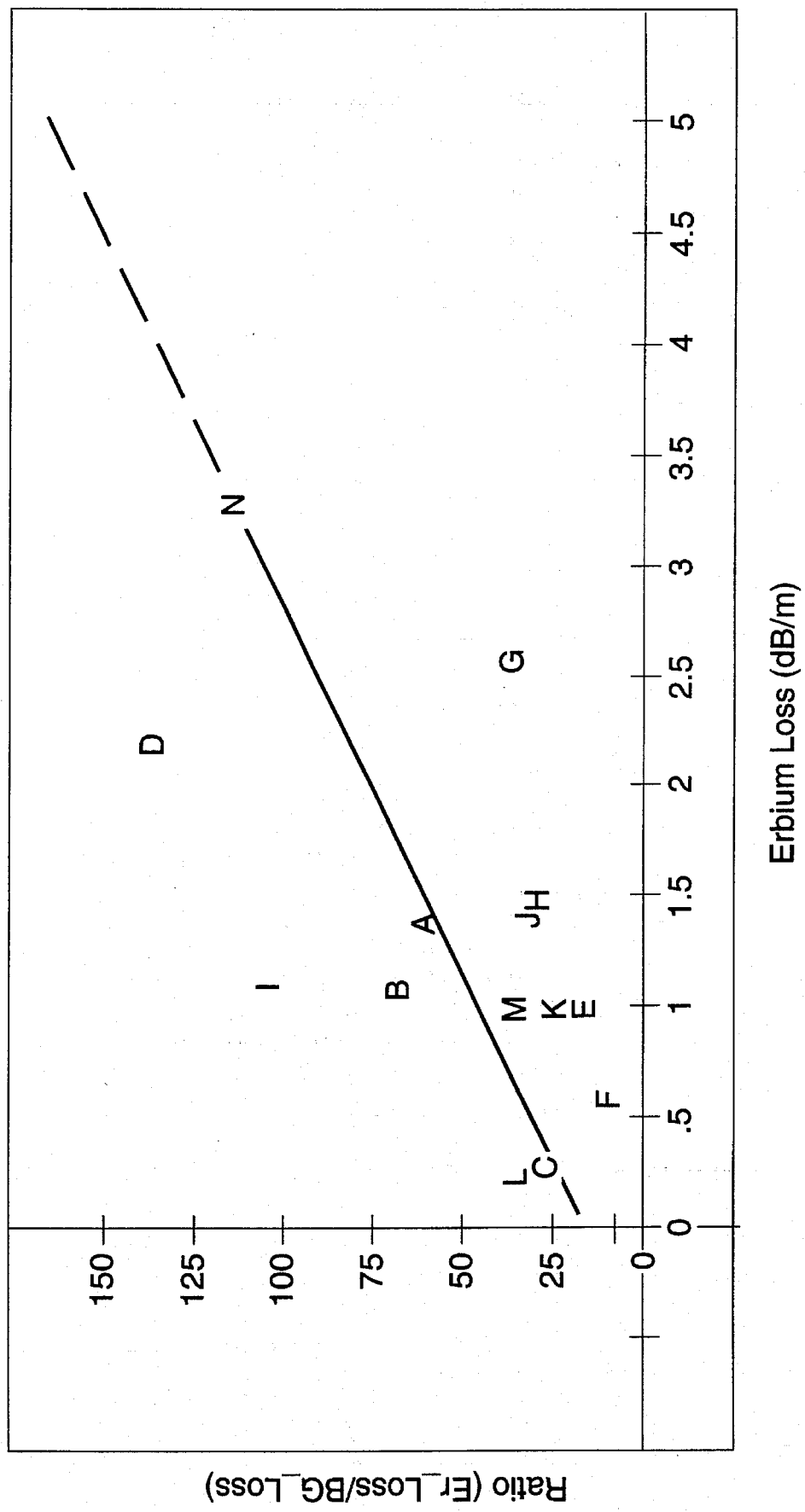

RARE EARTH DOPED OPTICAL FIBRE AMPLIFIERS

This invention relates to rare earth doped optical fibre amplifiers.

Optical amplifiers are optical devices in which a length of rare earth doped optical fibre is pumped at a pump wavelength of the rare earth dopant, to cause population inversion of the dopant, which causes a signal, at a signal wavelength, propagating along said fibre to be amplified.

An amplifier has a gain efficiency which is defined as the ratio between the amplification gain of the signal and the corresponding pump power.

In many applications of the optical amplifiers there is interest in obtaining high gain efficiency.

With submarine optical amplifiers, for example, there is great interest in using pump laser diodes of reduced power (for example 25 mW instead of 40 mW) to obtain the desired gain. This is because the life of the pump laser diode, and consequently the reliability of the amplifier and of the whole amplification system is significantly increased when the laser diode has a lower power output. This is important since in submarine optical telecommunication systems, due to the difficulty and expenses associated with the laying and maintenance of the cables and amplifiers connected thereto, an amplifier is expected to operate for the whole life of the cable (ie. 20 years or more) without failure.

In order to achieve high gain in such an amplifier a high numerical aperture (NA) is required—preferably a NA higher than 0.2. The Numerical Aperture of the fibre is defined:

$$NA=(n1^2-n2^2)^{1/2},$$

n1 and n2 being the refractive indexes of core and cladding respectively.

In this connection, Zervas et al, Optical Fibre Communication Conference, San Jose, Calif. Feb. 2–7, 1992, WK7 discloses that for erbium doped fibre amplifiers, optimum gain efficiency increases with fibre NA and that this increase is quasiquadratical for NA's from 0.1 to 0.4; the theory was confirmed by some laboratory results. Previously the use of an erbium doped optical fibre having a NA of 0.3 in an optical amplifier had been disclosed in Whitley et al, ECOC88, Conference Publication No. 292-Part 2, pp58–61 and Whitely, Electronics Letters Dec. 8, 1988, Vol. 24, No. 25, pp1537–39. Similarly, U.S. Pat. No. 5,005,175 discloses the use of erbium doped optical fibres having a NA in the range of from 0.2 to 0.35. Not differently from the above articles, also U.S. Pat. No. 5,027,079 which is assigned to the assignee of the above-mentioned U.S. Pat. No. 5,005,175 discloses that improved performance of an erbium doped fibre amplifier can be obtained by increasing the core/cladding refractive index difference and gives as an example an erbium doped fibre having a NA of 0.29 and a refractive index difference of 0.03.

We have found that, in practice, the gain efficiency of an amplifier making use of an industrial erbium doped fibre (125 μm diameter), with outer cladding in pure silica, suitable for splicing with conventional optical fibres, cannot be increased as expected simply by increasing the NA of the fibre.

In particular, while the relationship disclosed by Zervas is easily verified in industrial fibres for a NA less than 0.2, we observed that for a NA higher than 0.2 the increase of NA does not produce a corresponding increase in gain efficiency in absence of erbium confinement in the core.

Raising the NA of an optical fibre simply by increasing the level of the refractive index modifying dopant of the fibre, for example, a refractive index raising dopant such as $GeO_2$ typically used in a $SiO_2$ core of a fibre having a $SiO_2$ cladding, results in an increase in the difference between the coefficients of thermal expansion of the core and cladding.

This can result in manufacturing problems as discussed in U.S. Pat. No. 4,339,173 which relates to fibres for transmitting light signals and discloses the addition of $B_2O_3$ to the cladding of such a fibre to reduce the difference in the core and cladding coefficients of thermal expansion to prevent cracking of the preform during cooling and the substitution of $P_2O_5$ for some of the $GeO_2$ dopant in the core to make the softening point temperature of the core compatible with that of the cladding.

Also, in the case of $GeO_2$ doped $SiO_2$ cores, the production of UV colour centres, which give rise to significant increased attenuation in the fibre of signals up to about 1200 nm, is attributed to large stress gradients arising at the core/cladding interface arising from the thermo elastic stress which is created during cooling in manufacture and can be reduced by phosphorus codoping (see for example G. R. Atkins et al.: 'Control of the Radial Defect Distribution in Optical Fibres through Electron Trapping', pages 262–265 16th ACOFT, Adelaide, Australia, 1991 and 'The influence of Codopants and Fabrication Conditions on Germanium Defects in Optical Fibre Preforms'. IEEE Photonics Technology Letters, vol. 4, no. 1, January 1992).

We have found that apart from the above-mentioned manufacturing problems which arise during manufacture due to the difference in coefficients of thermal expansion of the core and cladding, in the case of rare earth doped fibres having a NA higher than 0.2 residual mechanical stress arising at the core/cladding interface due to that difference results in an undesirable increase in the background loss of the fibre. This is believed to be due at least in part to microcracks or microbending at the interface caused by the residual stress and giving rise to increased attenuation due to scattering and in the case of a $GeO_2$ doped $SiO_2$ core the activation of the UV colour centres formed during manufacture giving rise to attenuation at certain wavelengths—for example for an erbium doped fibre attenuation due to activation of UV colour centres will occur at a pump wavelength of 980 nm but not significantly at a signal wavelength of 1536 nm.

We have found that it is the increase in background loss of the fibre at the pump wavelength due to the level of residual stress at the core/cladding interface caused by the marked difference in coefficients of thermal expansion of the core and cladding which is responsible for the optimum gain efficiency of an amplifier being significantly lower than the theoretical value when the erbium doped fibre of the amplifier has a NA higher than 0.2 and has no erbium confinement.

DE 4041151A discloses a preform for a fibre having a $GeO_2$ doped $SiO_2$ core and $P_2O_5$ and $F_2$ doped silica cladding in which the content of the $P_2O_5$ in the cladding increases from the outer surface to the inner surface thereof; this is said useful to achieve a drawing speed of 120 m/min and an attenuation of 0.3 dB/km at 1300 nm.

No teaching is given in DE 4041151A on a possible use of its fibre in rare earth doped fibre amplifiers, nor to any effect of the Numerical Aperture on the fibre performance.

Tateda et al, IEEE Photonics Technology Letters, Vol. 4, No. 9, September 1992, which also makes no reference to rare earth doped fibres or fibres having a NA higher than 0.2 suggests that the residual stress in a fibre induced by drawing tension during fibre fabrication can be drastically reduced if the viscosity of the core and cladding materials were the same and proposes the addition of dopants to achieve this.

In accordance with the present invention we found that the difference in thermal expansion coefficients was the cause of stress at core-cladding interface and of a stress-related background loss or attenuation, particularly at certain wavelengths, and more particularly at pump wavelength in rare earth doped fibre amplifiers. The stress-related fibre attenuation, however, would have been considered negligible particularly in a fibre amplifier, making use of an active fibre of some meters lengths only, doped with a dopant having considerably higher light attenuating properties at the signal wavelength. In spite of its apparently negligible value, we found that such background loss was an important cause for the experienced low efficiency in amplifiers using high NA fibres and that such loss can be reduced below a prefixed value by limiting the thermal expansion coefficient steps in the fibre, or at least in the light conducting portion thereof.

In accordance with the present invention, an amplifier is provided having an erbium doped fibre, without erbium confinement, having a NA higher than 0.2 in which the background loss of the fibre at the pump wavelength is at a level which does not significantly reduce the optimum gain efficiency of the amplifier from its theoretical value. Briefly, this is achieved by having the difference in the coefficients of thermal expansion of the core and cladding adjacent the core/cladding interface at a value which is less than a predetermined value which corresponds to a ratio of erbium loss to background greater than a predetermined ratio.

To this end, the invention provides an optical amplifier for amplifying an optical signal having a signal wavelength, comprising an optical fibre having an erbium doped core surrounded by cladding, a pump for pumping the fibre with pump light at a pump wavelength coupled to the fibre, input means for inputting a signal to be amplified to the amplifier and output means for outputting an amplified signal from the amplifier, wherein said fibre has a NA higher than 0.2 and wherein the difference in the coefficient of thermal expansion of the core adjacent the core/cladding interface and the coefficient of thermal expansion of the cladding at at least one radius less than 2 µm from said interface is lower than a predetermined value, corresponding to a ratio of erbium loss to background loss, at said pump wavelength, greater than a minimum ratio calculated by a given increasing function of the ratio erbium loss/background loss versus erbium loss, in which said minimum ratio is about 20 when erbium loss is 0.15 dB/m and about 120 when erbium loss is 3.5 dB/m.

The above-mentioned given function may be linearly increasing in the range of erbium loss between 0.15 and 3.5 dB/m.

Preferably, the erbium loss in the fibre corresponds to an erbium content lower than a value at which significant erbium clustering in the glass takes place.

The erbium content may be lower than a value corresponding to an erbium loss of 3.3 dB/m or more preferably 2.5 dB/m.

The difference in the coefficient of thermal expansion of the core adjacent the core/cladding interface and the coefficient of thermal expansion of the cladding at at least one radius less than 2 µm from said interface may be less than 50%, preferably less than 20% and more preferably less than 10%.

The cladding may comprise an outer annular layer having a substantially constant coefficient of thermal expansion throughout its thickness and the difference in said substantially constant coefficient of thermal expansion and the coefficient of thermal expansion of the cladding radially inwardly of the outer layer but adjacent the outer layer is less than 50%, preferably less than 20% and more preferably less than 10%.

In preferred embodiments the coefficient of thermal expansion of said cladding varies gradually between adjacent said outer layer and said at least one radius in a stress relieving annular layer of said cladding between said outer layer and said core.

To this end, the stress relieving annular layer may contain thermal expansion modifying dopant, such as at least one of $P_2O_5$, $GeO_2$ and $B_2O_3$, present in an amount which increases from the radially outer region to the radially inner region thereof.

The thermal expansion modifying dopant may also modify the refractive index of the annular stress relieving layer in which case preferably that layer contains a refractive index modifying dopant (such as $F_2$, when the thermal expansion modifying dopant is a refractive index raiser) present in an amount which increases from the radially outer region to the radially inner region thereof to compensate for the refractive index modifying effect of the thermal expansion modifying dopant, whereby the refractive index of the annular stress relieving layer is substantially constant throughout its thickness.

Preferably the refractive index of the annular stress relieving layer varies by less than 0.4% across its thickness, and preferably is substantially the same as that of the annular outer layer.

The cladding may comprise an annular barrier layer immediately adjacent the core for providing a barrier to diffusion of dopants between the core and the remainder of the cladding radially outwardly of the barrier layer.

The cladding may also be defined as having an outer annular layer having a first coefficient of thermal expansion, the core having a second coefficient of thermal expansion, and the cladding having an annular stress relieving layer between said outer layer and said core having a coefficient of thermal expansion which varies radially inwardly from a third value to a fourth value, the third value being closer to the first value than the second value and the fourth value being closer to the second value than the first value.

Preferably the first and third values are substantially the same and the second and fourth values are substantially the same, and an annular barrier layer may be provided between said core and said stress relieving layer for providing a barrier to diffusion of dopants between said core and stress relieving layer.

When provided, the barrier layer, which will have a coefficient of thermal expansion significantly different from that of the adjacent core or cladding, should have a small radial thickness such that residual stress therein is small. For example, the barrier layer may have a radial thickness between 0.5 and 1.5 µm. The maximum radial thickness may be less than or equal to 0.22 $(\alpha_c \cdot r_c)/\alpha_b$, where $\alpha_c$ is the coefficient of thermal expansion of the core, $\alpha_b$ is the coefficient of thermal expansion of the barrier layer, and $r_c$ is the radius of the core.

The invention also includes a telecommunication system comprising a signal source for generating signals at a signal wavelength, a signal receiver for receiving signals at said signal wavelength, and a signal transmission fibre line between said source and receiver line for transmitting said signals, said line including an optical amplifier therein as defined above.

It is envisaged that aspects of the invention will have advantages when applied to amplifiers using rare earth doped fibres other than erbium doped fibres and accordingly the invention includes an optical fibre having a NA higher than 0.2, comprising a rare earth doped core and cladding surrounding said core, wherein the difference in the coefficient of thermal expansion of the core adjacent the core/cladding interface and the coefficient of thermal expansion of the cladding at at least one radius less than 2 μm from said interface is less than 50%.

It is also envisaged that aspects of the invention will have advantages when applied to fibres which are not rare-earth doped and accordingly the invention includes an optical fibre comprising a core surrounded with a cladding, an outer annular layer of the cladding having a first coefficient of thermal expansion, the core having a second coefficient of thermal expansion, and the cladding having an annular stress relieving layer between said outer layer and said core having a coefficient of thermal expansion which varies radially inwardly from a third value to a fourth value, the third value being closer to the first value than the second value and the fourth value being closer to the second value than the first value.

In order that the invention may be well understood, some embodiments thereof, which are given by way of example only will now be described, with reference to the accompanying drawings, in which.

Figure 5:
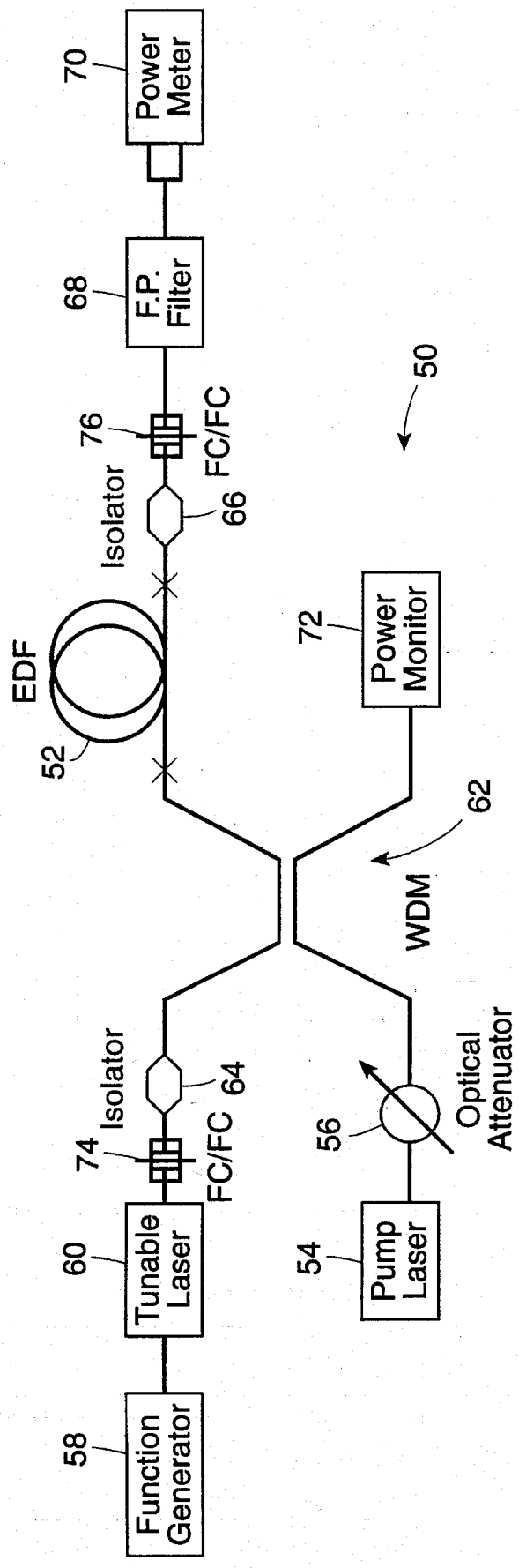

FIG. 5 schematically shows a test apparatus for measuring amplifier gain efficiency for amplifiers with erbium doped fibres of different NA's.

Figure 6:
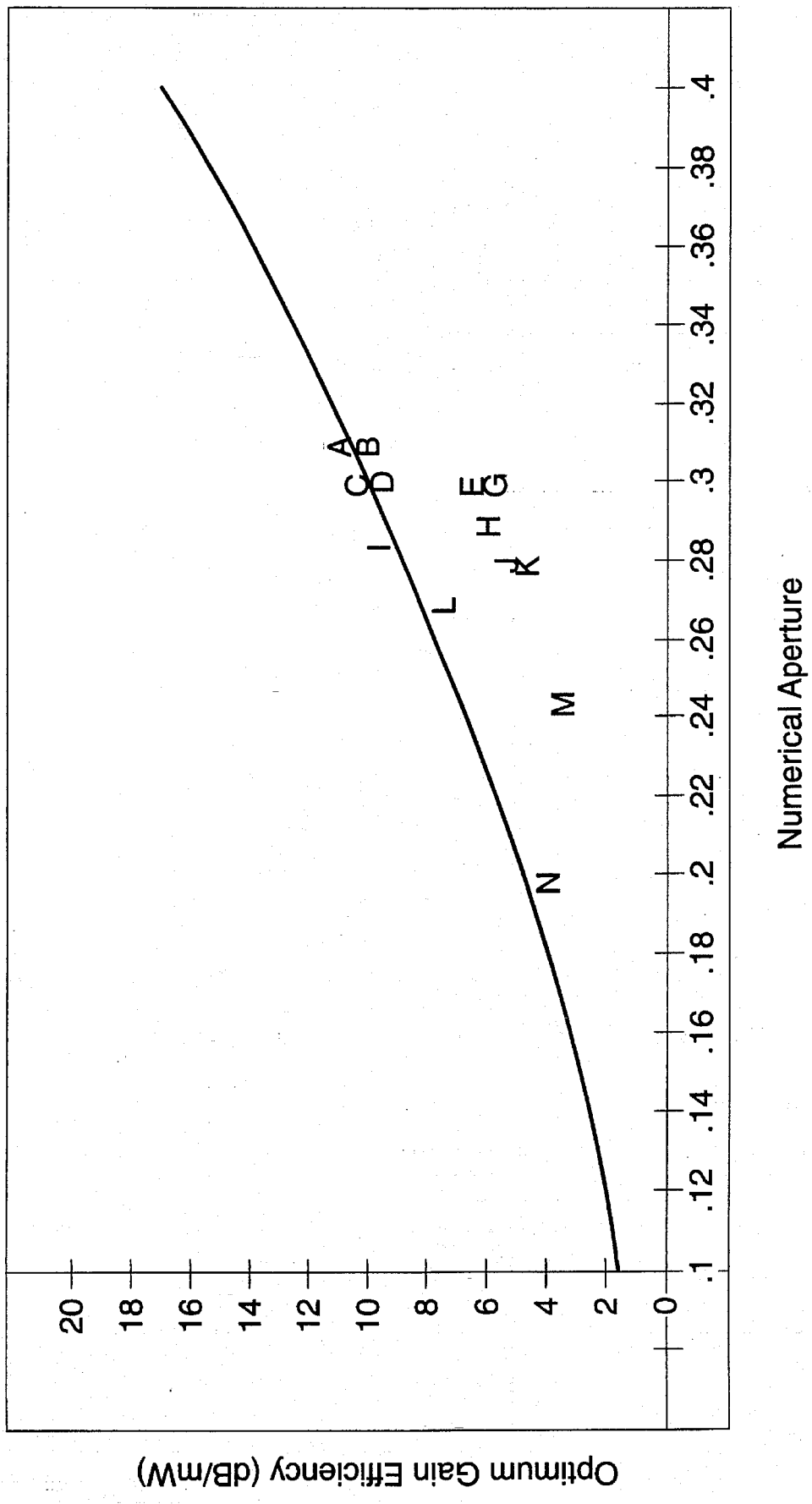

FIG. 6 is a graph showing optimum gain efficiency measured using the test apparatus of FIG. 5 with erbium doped fibres of different NA's; and FIG. 7 is a graph showing the ratio of erbium loss/background loss versus erbium loss for the fibres tested.

Figure 1:
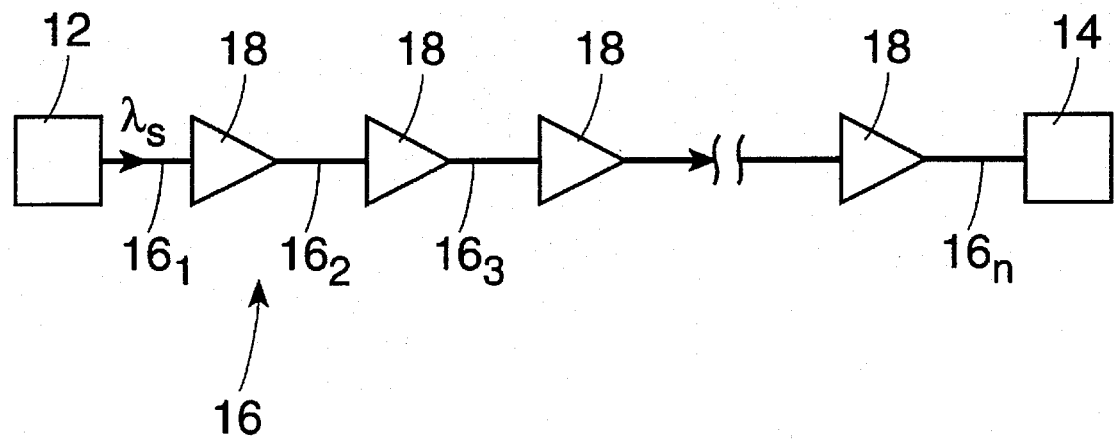
FIG. 1 is a block diagram of a telecommunication system including a plurality of amplifiers.

Referring first to FIG. 1, there is shown a telecommunication system 10 comprising a signal source 12 for generating signals at a signal wavelength $\lambda_s$, a signal receiver 14 for receiving signals at the signal wavelength $\lambda_s$, and a signal transmission fibre line 16 between the source and receiver for transmitting the signals. The line includes a plurality of optical amplifiers 18 therein for amplifying the signal from an upstream length of line 16 which signal has been attenuated during transmission therealong for onward transmission along a downstream length of line 16.

For example, the system 10 may be a submarine telecommunication system, in which the line 16 comprises optical cables $16_1$, $16_2$, $16_3$ ... $16_n$ respectively connecting the source 12 to the first of the amplifiers 18, that amplifier to the adjacent one and the last amplifier to the receiver 14.

Each optical cable $16_1$, $16_2$ ... $16_n$ comprises at least one optical fibre and has a length which may be of some tens of kilometers to some hundreds of kilometers. Each optical amplifier 18 can amplify the signal with a gain which is of the order of about 20–30 dB, or greater.

Figure 2:
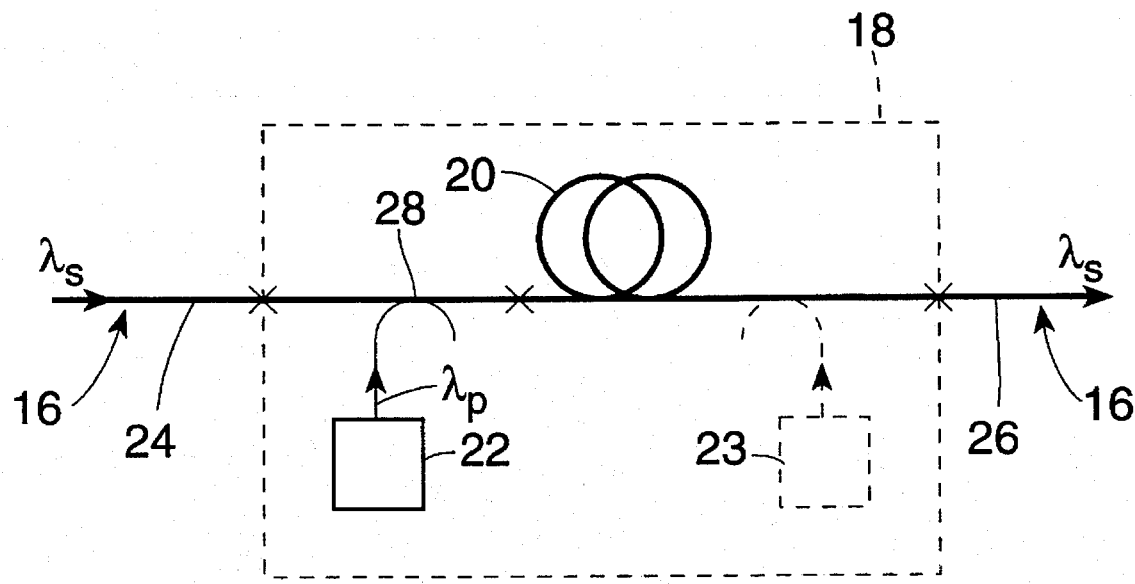
FIG. 2 is a block diagram of one of the amplifiers of the telecommunication system of FIG. 1.

As shown in FIG. 2 each optical amplifier 18 comprises a length of erbium doped optical fibre 20, a pump laser 22 for pumping the fibre 20 at a pump wavelength coupled to an end thereof and means coupling each end of the fibre 20 to a respective transmission fibre 24, 26 of the line 16 upstream and downstream of the amplifier for inputting a signal to be amplified to the amplifier and outputting an amplified signal from the amplifier. As shown the pump 22 and fibre 24 upstream of the amplifier are coupled via a dichroic coupler 28 to an upstream end of the erbium doped fibre 20 so that the pump and signal light co-propagate through the fibre 20. However, according to system requirements the pump laser may instead be coupled to the downstream end of the erbium doped fibre 20 as indicated in dotted line at 23 so that the pump and signal light counter-propagate through the fibre or a respective pump laser may be coupled to each end of the fibre 20.

Preferably, the wavelength of the pump is 980 nm.

An erbium doped fibre, suitable for use with these amplifiers, is a single mode fibre, both at signal and pump wavelength, made of $SiO_2$ glass, having the core doped with $GeO_2$, or $Al_2O_3$, or both, defining an area with higher refractive index; a cladding surrounds the core, having a constant refractive index, lower than that of the core, defining a so-called "step index" profile of the fibre.

Preferably the cladding is formed by an inner, or synthetic cladding, and by an outer cladding, made of pure silica, having the same refractive indexes.

This fibre structure, and particularly the cladding composition, conveniently enable direct and low-loss fibre-to-fibre fusion splicing with the conventional transmission optical fibres.

Conveniently, the erbium doped fibre is made through the so called "MCVD" technique, well known in the art, which produces a particularly sharp step-index profile, with an index change, at the core-cladding interface, confined in less than about 0.5 μm.

The MCVD technique is used to make the core and the synthetic cladding of the fibre, that is the area where the light propagates; the addition of dopants such as erbium or alumina is conveniently made by the "solution doping" technique, known in the art.

In a preferred embodiment, suitable to operate with a signal having a wavelength in the range 1530–1560 nm, the core of the fibre 20 is $SiO_2$ doped with $GeO_2$ (and possibly $Al_2O_3$) as an index raiser in addition to erbium.

In another embodiment, suitable for example for submarine amplifiers and other applications accepting a narrow amplification band and requiring particularly high amplification gains, the signal has a wavelength in the range 1531–1536 nm, and the Er doped fibre is doped with $GeO_2$ only to increase the refractive index, taking advantage of the high gain peak of erbium in a $SiO_2/GeO_2$ system in that wavelength range.

In an amplifier as shown in the example, a fibre 20 having a NA of 0.18 has been tested and a gain efficiency of 4 dB/mW is experienced; this efficiency is close to the theoretical optimum gain efficiency.

For increasing the efficiency of the amplifier, without confining the erbium to the central region of the fibre core, according to the theory a higher NA has to be used.

However, in tests (described-hereafter) using fibres having a NA in the range 0.245 to 0.3 although an increase in gain efficiency was obtained the optimum gain efficiency was found to be significantly lower than the theoretical value. The NA of the fibres used in the tests would result in the coefficient of thermal expansion of the core being substantially greater than that of the cladding if the cladding were undopod $SiO_2$. For example, for a NA of 0.3 these coefficients would be $3.1 \times 10^{-6}$ $C^{-1}$ for the core and $0.5 \times 10^{-6}$ $C^{-1}$ for the cladding in view of the $GeO_2$ content (approximately 24 mol %) of the core required to provide a NA of 0.3.

The difference in coefficients of thermal expansion of the core and cladding in such an erbium doped fibre would give rise to a residual stress level at the interface of the core and cladding which would cause a high background loss in the fibre due, we believe, to microcracks or microbending at the interface and the activation of UV colour centres. The high background loss of the fibres, particularly at the pump wavelength of 980 nm, is considered the cause of the low efficiency experienced in the above fibres, probably due to the increased attenuation caused to the pump wavelength propagating in the length of the active fibre.

Figure 3:
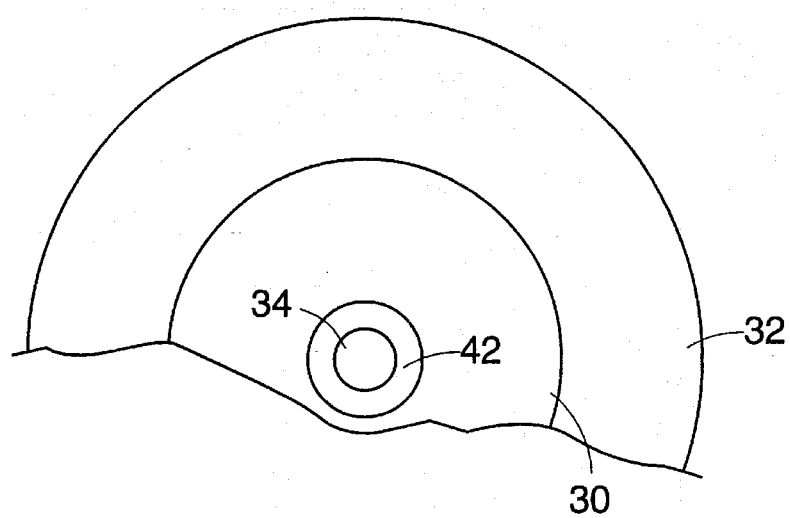
FIG. 3 is a partial cross-section of an erbium doped fibre of the amplifier of FIG. 2 (not to scale)

In order to reduce this background loss and as shown in FIG. 3, the cladding in the embodiment includes a stress relieving annular layer 30 between an outer $SiO_2$ layer 32 of the cladding and the erbium doped $GeO_2$—$SiO_2$ core which is referenced 34.

Figure 4:
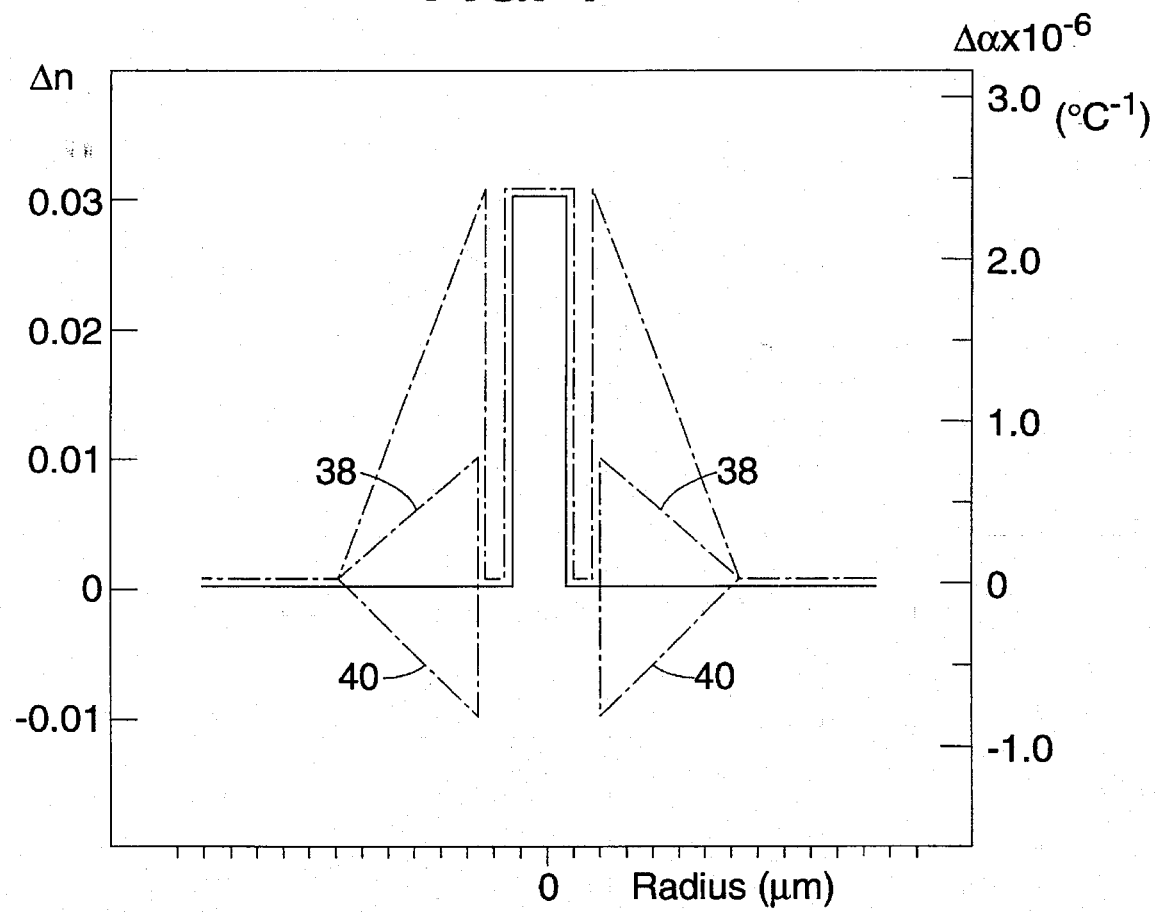
FIG. 4 shows theoretical profiles of the coefficient of thermal expansion and refractive index of the fibre of FIG. 3.

In the stress relieving annular layer 30 the coefficient of thermal expansion varies radially inwardly from the value of the coefficient of thermal expansion of the outer layer 32 and the value of the coefficient of thermal expansion of the core as indicated by the chain dotted line 36 in FIG. 4 which shows the difference $\Delta\alpha$ in this coefficient from that of the outer cladding layer across the fibre for the case where the NA is 0.3. As indicated the value of the coefficient of thermal expansion of the outer layer is substantially constant throughout its thickness and the value of the coefficient of thermal expansion of the core is substantially constant throughout its thickness. The variation in the coefficient of thermal expansion across the thickness of the stress relieving layer 30 is achieved by doping that layer with $P_2O_5$, which is a thermal expansion raising dopant, such that the layer 30 contains $P_2O_5$ in an amount which increases from the radially outer region of the layer 30 to the radially inner region thereof. In addition to raising the coefficient of thermal expansion, $P_2O_5$ acts as a refractive index raiser. Accordingly, in order to compensate for the refractive index raising effect of the $P_2O_5$, as indicated by the dotted lines 38 in FIG. 4, the layer 30 is doped with $F_2$, which is a refractive index lowering dopant, such that the layer 30 contains $F_2$ in an amount which increases from the radially outer region of the layer 30 to the radially inner region thereof with a consequent effect on the refractive index, as indicated by the dotted lines 40 in FIG. 4, whereby the refractive index of the layer 30 is substantially constant throughout its thickness and is matched to the refractive index of the outer cladding layer 32 as indicated in FIG. 4 where the solid line shows the difference $\Delta n$ in refractive index from that of the outer cladding layer across the fibre. The refractive index of the layer 30 is matched to that of the outer layer 32 to preserve the step-index profile of the fibre.

In order to increase the coefficient of thermal expansion ($0.5\times10^{-6}$ $C^{-1}$) of undoped $SiO_2$ to the coefficient of thermal expansion ($3.1\times10^{-6}$ $C^{-1}$) of the $GeO_2$—$SiO_2$ core when the core contains 24 mol % $GeO_2$ it is necessary to dope the $SiO_2$ with approximately 15 mol % $P_2O_5$. Thus in the embodiment the content of the $P_2O_5$ in the stress relieving layer increases from about 0 mol % at its radially outer region to about 15 mol % at its radially inner region. The inclusion of 15 mol % $P_2O_5$ gives rise to an increase of about 0.01 in refractive index and about 3 mol % $F_2$ is required to provide a corresponding decrease in refractive index. Accordingly the content of $F_2$ in the stress relieving layer increases from about 0 mol % at its radially outer region to about 3 mol % at its radially inner region.

Manufacturing tolerances may allow the content of $P_2O_5$ and $F_2$ to vary by up to say 0.4 mol % at any given radius from the theoretical content, with a possible resulting variation in the refractive index of the layer 30 across its thickness. However, preferably this variation is less than 0.4%.

The cladding of the fibre also includes an annular barrier layer 42 immediately adjacent the core 34 for providing a barrier to diffusion of dopants between the core and the remainder of the cladding radially inwardly of the barrier layer 42. In the embodiment the barrier layer is provided since diffusion of $P_2O_5$ from the stress relieving layer 30 to the core is undesirable. The barrier layer is undoped $SiO_2$ and accordingly does not alter the step-index profile of the fibre. Of course the coefficient of thermal expansion of the barrier layer is significantly different from that of the core and the radially inner region of the stress relieving layer 30. However, the radial thickness of the barrier layer is sufficiently small that the residual stress therein caused by this difference is small and has minimal effect on the cladding/core interface.

The fibre illustrated by FIGS. 3 and 4 is drawn from a preform manufactured using the MCVD process and solution doping. Flow rates (in SCC/MIN) and the number of passes of the reagents for forming the preform layers in a $SiO_2$ substrate tube corresponding to the stress relieving layer, barrier layer and core are given in the following table:

| | Passes | $SiCl_4$ | $GeCl_4$ | $POCl_3$ | $CF_2Cl_2$ | $O_2$ |
|---|---|---|---|---|---|---|
| Stress relieving layer | 30 | 600 | — | 0 → 370 | 0 → 7 | 800 |
| Barrier layer | 2 | 400 | — | — | — | 600 |
| Core | 1 | 100 | 300 | — | — | 300 |

Erbium is introduced into the core layer of the preform, without confinement, by solution doping.

In the drawn fibre, the core 34 has a diameter of 2.3 µm, the barrier layer 42 has a radial thickness of 1 µm (giving it an outside diameter of 4.3 µm), the stress relieving layer 30 has a radial thickness of 5.35 µm (giving it an outside diameter of 15 µm) and the outer cladding layer 32 has a radial thickness of about 55 µm. The fibre has a NA of 0.3 as mentioned previously, a cut-off wavelength of 900 nm, a mode field diameter at 980 nm of 2.6 µm and a mode field diameter at 1536 nm of 4.2 µm. Thus, both of these mode field diameters are within the $SiO_2$ barrier layer 42 and there is no field extension into the stress-relieving layer 30 when the thickness of the barrier layer is 1 µm. Furthermore, with a thickness of about 5 µm the change of the coefficient of thermal expansion across the stress relieving layer is about $0.5\times10^{-6}$ $C^{-1}$ µm$^{-1}$ which experimentally has been shown to be preferable for preventing undesirable residual stress and the core/cladding interface.

Although the radial thicknesses of the barrier layer and stress relieving layer are 1 µm and about 5 µm it is to be understood that the barrier layer may have a radial thickness of between 0.5 and 1.5 µm and the stress relieving layer may have a radial thickness of between 2.5 and 7.5 µm.

Below the lower limit of 0.5 µm the barrier layer will not be thick enough to prevent $P_2O_5$ diffusing into the core. Above the upper limit of 1.5 µm, stress due to the presence of the barrier layer will significantly reduce the effectiveness of the stress relieving layer. In this regard it has been found experimentally that the ratio of the product of the coefficient of thermal expansion of the barrier layer $\alpha_b$ and its radius $r_b$ to the product of the coefficient of thermal expansion of the core $\alpha_c$ and its radius $r_c$ should be less than or equal to 0.22. In other words $r_b \leq 0.22$ ($\alpha_c r_c/\alpha_b$), and in the present case $r_b \leq 0.22$ ($3\times10^{-6}\times1.15)/(0.5\times10^{-6})$ that is $r_b \leq 1.51$.

The lower limit of 2.5 µm for the thickness of the stress relieving layer 30 is determined by the need to locate the transition of the coefficient of thermal expansion in the cladding to that of the $SiO_2$ outer layer sufficiently far from the core/cladding interface that there is no adverse effect caused thereby on the optical power of the guided mode. In this regard it has been found experimentally that the ratio of the outer diameter of the layer 30 to the diameter of the core should be not less than 4. In the present case where the core diameter is 2.3 μm and the barrier layer outer diameter is 4.3 μm if the layer 30 had a thickness of 2.5 μm its outer diameter would be 9.3 μm which is greater than four times the core diameter.

The upper limit of 7.5 μm is determined by the requirement that the presence of the stress relieving layer should not adversely affect the function of the outer layer of the cladding as a support. In this regard it is desirable to satisfy the following condition of radial expansion thermal balance:

$$\int_O^M \alpha(r)dr < \int_M^R \alpha(r)dr$$

where R is the outside diameter of the fibre and M is the outside diameter of the stress relieving layer 30.

FIG. 5 shows a test apparatus 50 for measuring the gain efficiency of an amplifier using alternative erbium doped fibres. The apparatus simulates the amplifier of FIG. 2 but has extra components for test purposes. The apparatus comprises an erbium doped fibre 52 arranged to be pumped by a pump laser 54 via an optical attenuator 56 and supplied with a signal to be amplified from a function generator 58 and tunable laser 60. The pump and signal light copropagate through the fibre 52 being coupled to one end via a wavelength division multiplexer for coupling wavelengths of 980 nm from the pump laser and 1536 nm from the tunable laser 60 via an optical isolator 64 to the input end of the fibre 52. An optical isolator 66 is also provided at the output end of the fibre 52 and a Fabry-Perot optical filter 68 is provided downstream of the isolator 66 so that only the signal of interest is measured by a power meter 70 connected thereto. A power meter 72 is connected to the wavelength division multiplexer for measuring the power of the pump light. Connectors 74 and 76 are provided upstream and downstream respectively of the isolators 64 and 66 for convenience.

The theoretical maximum efficiency is calculated considering a number of characteristics of the fibre, including NA, cut-off wavelength $\lambda_c$, Er confinement factor, fibre length and pump power.

With a confinement factor of 1 (ie. no confinement) and fixing the remaining parameters to their optimum value, the optimum gain efficiency is believed to depend on NA according to the relationship: $E=88\times NA^{1.8}$, ie. a "quasiquadratical relationship" as indicated by Zervas et al.

The line plotted in FIG. 6 is the result of these calculations.

The actual results for each fibre tested have been identified in FIG. 6 with reference letters corresponding to those used in the following table to identify the fibres and which lists not only the overall gain efficiency but also the NA, erbium loss and ratio of erbium loss to background loss at the pump wavelength (980 nm). The latter two values are plotted in FIG. 7.

| Fibre | NA | Er Loss (dB/m) | Ratio ErLoss/ BgLoss | O.G. Efficiency (dB/mW) | Cladding |
|---|---|---|---|---|---|
| A | 0.31 | 1.4 | 58.33 | 10.9 | MI–MS |
| B | 0.31 | 1.1 | 68.11 | 10.1 | MI–MS |
| C | 0.30 | 0.29 | 24.57 | 10.3 | MI–MS |
| D | 0.30 | 2.2 | 136.64 | 9.7 | MI–MS |
| E | 0.30 | 1.0 | 17.0 | <6 | MI |
| F | 0.30 | 0.6 | 9.0 | <6 | MI |
| G | 0.30 | 2.6 | 37 | <6 | MI |
| H | 0.29 | 1.5 | 30 | 6 | MI |
| I | 0.285 | 1.1 | 104.76 | 9.5 | MI–MS |
| J | 0.28 | 1.4 | 31 | <5 | MI |
| K | 0.28 | 1.0 | 25 | <5 | MI |
| L | 0.27 | 0.26 | 30 | 7.4 | MI–MS |
| M | 0.245 | 1.0 | 37 | 3.5 | MI |
| N | 0.20 | 3.3 | 113.79 | 4.0 | MI |

In the above table fibre C is the fibre disclosed in connection with FIGS. 3 and 4 and fibres A, B, D, I and L are fibres made in the same manner—ie. fibres in which the cladding is provided with a stress relieving annular layer 30 as described above and may be described as matched index - matched stress (MI-MS). Fibres E to H, J, K and N on the other hand have a cladding which is not provided with a stress relieving annular but does have substantially constant refractive index throughout its thickness and accordingly may be described as matched index (MI).

From FIG. 6 it will be seen that fibres A to D, I and L provided with a MI-MS cladding produce an optimum gain efficiency close to the theoretical maximum whereas fibres E to H, J and K having NA's of the same order produce optimum gain efficiencies which are significantly lower than the theoretical maximum values.

Referring now to FIG. 7 it will be seen that the fibres A to D, I and L which produce optimum gain efficiencies close to the theoretical maximum have a relationship between erbium loss and background loss at the pump wavelength which is such that the ratio of erbium loss to background loss is greater than a minimum ratio calculated by a given increasing function of the ratio of erbium loss/background loss versus erbium loss in which the minimum ratio is about 20 when the erbium loss is 0.15 dB/m and about 120 when the erbium loss is about 3.5 dB/m. This given function may be taken to be substantially linearly increasing in the range of erbium loss between 0.15 and 3.5 dB/m and is represented in FIG. 7 by way of example as a straight line having the equation ratio=15.8+0.03×erbium loss measured in dB/km.

The line is interrupted before erbium loss reaches zero, because a minimum theoretical background loss in the fibre cannot be avoided, and represented with a broken line after an erbium loss greater than about 3, because with increasing erbium content in the fibre (and corresponding erbium loss) the risk of clustering becomes relevant depending on the fibre characteristics and construction, which can alter the results. In this regard, it is preferred that the erbium loss in the fibre should correspond to an erbium content lower than a value at which significant erbium clustering occurs. Having regard to FIG. 7, the erbium content should be lower than a value corresponding to an erbium loss of 3.3 dB/m or more preferably 2.5 dB/m.

Whilst the plots from fibres A to D, I and L are on or above the line in FIG. 7, the plots for fibres E to H, J and K, which produce optimum gain efficiencies which are substantially less than the theoretical maximum values are below the line.

An explanation for these results is believed to be that the presence of stress, due to the thermal expansion coefficiency difference causes, through the above explained mechanisms, an increased attenuation of the pump wavelength and, accordingly, a reduction in the background loss, obtained through a matching of the thermal expansion coefficients of core and cladding, enable good results in terms of efficiency to be obtained.

Moreover, we have found that a relatively high value of background loss can be accepted when the fibre in the amplifier has a short optimum length (for example, 10–30 m), that is the erbium content (measured as erbium loss) is high, while in case of low erbium contents, (ie. low erbium losses), which require an active fibre with relatively long optimum length (up to 100 m, for example), the acceptable background loss is considerably lower.

It will be noted that although fibre N is not provided with an MI-MS cladding like fibres A to D, I and L, it nevertheless produces an optimum gain efficiency close to the theoretical maximum. However, this can be explained in terms of our findings, by its relatively low value of NA (0.2) compared with the other fibres and the consequential smaller difference in the coefficients of thermal expansion of the core and cladding and corresponding lower level of residual stress arising at the core/cladding interface.

It is to be understood that whilst it is desirable to arrange for the coefficient of thermal expansion of the stress relieving layer 30 at its radially inner region to be the same as that of the core, this is not essential to provide an advantageous reduction in the residual stress at the cladding/core interface. In this regard, an advantageous reduction may be provided if the difference is less than say 50%, preferably less than 20% and more preferably less than 10%. In this connection it should be noted that a 50% difference between the coefficients of thermal expansion of the core and the stress relieving layer at its radially inner region in a fibre having a 0.3 NA has a loss performance which is substantially the same as that of a fibre having a NA of 0.2 in which no stress relieving layer is provided. Accordingly, having regard to the presence of the barrier layer, which may be up to 1.5 μm thick and measurement accuracy the difference in the thermal expansion of the core and that of the cladding at at least one radius less than 2 μm from the core cladding interface should be less than 50%, preferably less than 20% and more preferably less than 10%.

For analogous reasons, whilst it is preferable to have the coefficient of thermal expansion of the stress relieving layer 30 at its radially outer region the same as that of the outer cladding layer 32, in order to reduce residual stress at the interface of these two layers, acceptable results are achievable where the difference between these coefficients is less than 50%, preferably less than 20% and more preferably less than 10%.

The coefficient of thermal expansion at a given radius is determined by making an analysis of the concentration of the components of the fibre at that radius and referring to known tables.

It is also preferred that the coefficient of thermal expansion of the cladding in the stress relieving layer 30 varies gradually between adjacent the outer layer 30 and the above-mentioned radius less than 2 μm from the core/cladding interface, and as shown by the chain-dotted line in FIG. 4 preferably this variation should be continuous and more preferably substantially uniform.

In any event, it will be appreciated that the stress relieving layer 30 has a coefficient of thermal expansion which varies radially inwardly from one value, which is closer to the value of the coefficient of thermal expansion of the outer cladding layer 32 than to the value of the coefficient of thermal expansion of the core 34, to another value, which is close to the value of the coefficient of thermal expansion of the core than to the value of the coefficient of thermal expansion of the outer cladding layer. Furthermore, as indicated in FIG. 4 preferably these two values of the coefficient of thermal expansion of the layer 30 are substantially the same as the values of the coefficients of thermal expansion of the outer cladding layer and core respectively.

It will be understood that due to diffusion of dopants, the theoretical values of the coefficient of thermal expansion and refractive index at given radii differ from those achieved in practice. Furthermore in this regard although the barrier layer 42 is described as being of undoped $SiO_2$, some dopant from the core and stress relieving layer will diffuse into it. For example in the embodiment the barrier layer may contain up to 0.1 mol % $P_2O_5$, 0.3 mol % $F_2$, 0.4 mol % $GeO_2$, 0.4 mol % $Al_2O_3$, 0.1 mol % $B_2O_3$, due to diffusion.

Also, the barrier layer may be intentionally doped with $GeO_2$ (say 1.4 mol %) and $F_2$ (say 0.6 mol %) (in an index-matching relationship), even if this renders less effective the barrier effect and possibly a slightly bigger size of the barrier layer is required.

The presence of small amounts of dopants in the SiO the barrier layer causes the diffusion of the dopants from the core and from the stress relieving layer to increase: accordingly, if dopants are introduced in the barrier layer for any possible reasons, a correspondingly thicker barrier layer would be required to maintain the desired concentration profile in the core and in the stress relieving layer. However, said thickness increase of the barrier layer should not exceed a value causing a significant effect on the background loss.

It is to be understood that other dopants may be used in the stress relieving layer. For example, a combination of $GeO_2$ and $B_2O_3$ may be used as a thermal expansion increasing dopant with $F_2$ being used as before as a refractive index lowered to compensate with $B_2O_3$ for the refractive index raising effect of the $GeO_2$. In this example in order to increase the coefficient of thermal expansion of the stress relieving layer to that of an $SiO_2$ core having a $GeO_2$ content of approximately 24 mol % required to provide a NA of 0.3, a combination of 20 (±0.4) mol % $GeO_2$ and 10 (±0.4) mol % $B_2O_3$ would be required, and 4.0 (±0.1) mol % $F_2$ would be needed to fully compensate from the refractive index raising effect of the $GeO_2$.

Thus in the stress relieving layer, which again is between 2.5–7.5 μm and preferably 5 μm, the content of $GeO_2$, $B_2O_3$ and $F_2$ increases from about 0 mol % at the radially outer region of the layer to about 20, 10 and 4 mol % respectively at the radially inner region thereof.

In this embodiment a barrier layer is not required since small amounts of dopant diffusion between the core and stress relieving layer are acceptable.

Another combination of dopants from the stress relieving layer is $Al_2O_3/B_2O_3/F_2$. Although it is preferred to use $GeO_2$ as the refractive index raising dopant of the core, $P_2O_5$ or $Al_2O_3$ may also be used.

The barrier layer between the core and the stress relieving layer need only be present when large amounts of dopant diffusion is undesirable. The following table indicates whether or not a $SiO_2$ barrier layer should be provided for various combinations of core and stress relieving layer dopants.

| Stress relieving layer | $GeO_2$ | Core $Al_2O_3$ | $P_2O_5$ |
|---|---|---|---|
| $P_2O_5$—F | Yes | Yes | No |
| $GeO_2$—$B_2O_3$—F | No | Yes | Yes |
| $Al_2O_3$—$B_2O_3$—F | Yes | No | Yes |

In addition to the content of permissible $P_2O_5$, $GeO_2$ and F mentioned above, when $Al_2O_3$ and $B_2O_3$ are present in the fibre the barrier layer may contain up to 1.4 mol % of $Al_2O_3$ and up to 0.1 mol % of $B_2O_3$.

Although the invention has been described with reference to a particular design of amplifier it is to be understood that it is applicable to other optical amplifier designs which utilise pumped rare earth doped optical fibres, for example, amplifiers such as those disclosed in EP-A-0425014, EP-A-0426221, EP-A-0439867, EP-A-0458256 and EP-A-0509577.

I claim:

1. An optical amplifier for amplifying an optical signal having a signal wavelength, comprising an optical fibre having an erbium doped core surrounded by cladding, a pump for pumping the fibre with pump light at a pump wavelength coupled to the fibre, input means for inputting a signal to be amplified to the amplifier and output means for outputting an amplified signal from the amplifier, wherein said fibre has a NA higher than 0.2 and wherein the difference in the coefficient of thermal expansion of the core adjacent the core/cladding interface and the coefficient of thermal expansion of the cladding at at least one radius less than 2 μm from said interface is lower than a predetermined value, corresponding to a ratio of erbium loss to background loss, at said pump wavelength, greater than a minimum ratio calculated by a given increasing function of the ratio erbium loss/background loss versus erbium loss, in which said minimum ratio is about 20 when erbium loss is 0.15 dB/m and about 120 when erbium loss is 3.5 dB/m.

2. An amplifier as claimed in claim 1, wherein said given function is substantially linearly increasing in the range of erbium loss between 0.15 and 3.5 dB/m.

3. An amplifier as claimed in claim 1 or 2, wherein the erbium loss in the fibre corresponds to an erbium content lower than a value at which significant erbium clustering in the glass takes place.

4. An amplifier as claimed in claim 1 or 2, wherein said erbium content is lower than a value corresponding to an erbium loss of 3.3 dB/m.

5. An amplifier as claimed in claim 4, wherein said erbium content is lower than a value corresponding to an erbium loss of 2.5 dB/m.

6. An amplifier as claimed in any one of claims 1 or 2, said difference in the coefficient of thermal expansion of the core adjacent the core/cladding interface and the coefficient of thermal expansion of the cladding at at least one radius less than 2 μm from said interface is less than 50%.

7. An amplifier as claimed in claim 6, wherein said difference is less than 20%.

8. An amplifier as claimed in claim 7, wherein said difference is less than 10%.

9. An amplifier as claimed in any one of claims 1 or 2, wherein the cladding comprises an outer annular layer having a substantially constant coefficient of thermal expansion throughout its thickness and the difference in said substantially constant coefficient of thermal expansion and the coefficient of thermal expansion of the cladding radially inwardly of the outer layer but adjacent the outer layer is less than 50%.

10. An amplifier as claimed in claim 9, wherein said difference in said substantially constant coefficient of thermal expansion and the coefficient of thermal expansion of the cladding radially inwardly of the outer layer but adjacent the outer layer is less than 20%.

11. An amplifier as claimed in claim 10, wherein said difference in said substantially constant coefficient of thermal expansion and the coefficient of thermal expansion of the cladding radially inwardly of the outer layer but adjacent the outer layer is less than 10%.

12. An amplifier as claimed in claim 9, wherein the coefficient of thermal expansion of said cladding varies gradually between adjacent said outer layer and said at least one radius in a stress relieving annular layer of said cladding between said outer layer and said core.

13. An amplifier as claimed in claim 12, wherein said stress relieving annular layer contains thermal expansion modifying dopant present in an amount which increases from the radially outer region to the radially inner region thereof.

14. An amplifier as claimed in claim 12, wherein said thermal expansion modifying dopant comprises at least one of $P_2O_5$, $GeO_2$ and $B_2O_3$.

15. An amplifier as claimed in claim 14, wherein said thermal expansion modifying dopant is $P_2O_5$, the content of which increases from about 0 mol % at said radially outer region to about 15 mol % at said radially inner region.

16. An amplifier as claimed in claim 14, wherein said thermal expansion modifying dopant comprises $GeO_2$ and $B_2O_3$, the content of the $GeO_2$ increasing from about 0 mol % at said radially outer region to about 20 mol % at said radially inner region and the content of the $B_2O_3$ increasing from about 0 mol % at said radially outer region to about 10 mol % at said radially inner region.

17. An amplifier as claimed in claim 13, wherein said stress relieving annular layer contains a refractive index modifying dopant present in an amount which increases from the radially outer region to the radially inner region thereof to compensate for the refractive index modifying effect of the thermal expansion modifying dopant, whereby the refractive index of the annular stress relieving layer is substantially constant throughout its thickness.

18. An amplifier as claimed in claim 17, wherein said expansion modifying dopant comprises $F_2$.

19. An amplifier as claimed in claim 17, wherein the refractive index of the annular stress relieving layer varies by less than 0.4% across its thickness.

20. An amplifier as claimed in claim 17, wherein the refractive index of the annular stress relieving layer is substantially the same as that of the annular outer layer.

21. An amplifier as claimed in claim 12, wherein said annular stress relieving layer has a radial thickness between 2.5 and 7.5 μm.

22. An amplifier as claimed in claim 21, wherein said radial thickness of said annular stress relieving layer is about 5 μm.

23. An amplifier as claimed in claim 1, wherein said cladding comprises an annular barrier layer immediately adjacent the core for providing a barrier for diffusion of dopants between the core and the remainder of the cladding radially outwardly of the barrier layer.

24. An amplifier as claimed in any one of claims 1 or 2, wherein said cladding has an outer annular layer having a first coefficient of thermal expansion, the core has a second coefficient of thermal expansion, and the cladding has an annular stress relieving layer between said outer layer and said core having a coefficient of thermal expansion which varies radially inwardly from a third value to a fourth value, the third value being closer to the first value than the second value and the fourth value being closer to the second value than the first value.

25. An amplifier as claimed in claim 24, wherein the first and third values are substantially the same and the second and fourth values are substantially the same.

26. An amplifier as claimed in claim 24 comprising an annular barrier layer between said core and said stress relieving layer for providing a barrier for the diffusion of dopants between said core and stress relieving layer.

27. An amplifier as claimed in claim 23, wherein said barrier layer contains less than 0.2 mol % $P_2O_5$, 1.4 mol % $GeO_2$, 1.4 mol % $Al_2O_3$, 0.1 mol % $B_2O_3$, and 0.6 mol % $F_2$.

28. An amplifier as claimed in claim 23, wherein said barrier layer has a radial thickness between 0.5 and 1.5 μm.

29. An amplifier as claimed in claim 25, wherein the maximum radial thickness of the barrier layer is less than or equal to 0.22 $(\alpha_c \cdot r_c)/\alpha_b$, where $\alpha_c$ is the coefficient of thermal expansion of the core, $\alpha_b$ is the coefficient of thermal expansion of the barrier layer, and $r_c$ is the radius of the core.

30. An amplifier as claimed in any one of claims 1 or 2, for amplifying signals having a wavelength of 1536 nm, wherein said pump wavelength is 980 nm.

31. A telecommunication system comprising a signal source for generating signals at a signal wavelength, a signal receiver for receiving signals at said signal wavelength, and a signal transmission fibre line between said source and receiver line for transmitting said signals, said line including an optical amplifier therein as claimed in any one of the claims 1 or 2.

32. An optical fibre having a NA higher than 0.2, comprising a rare earth doped core and cladding surrounding said core, wherein the difference in the coefficient of thermal expansion of the core adjacent the core/cladding interface and the coefficient of thermal expansion of the cladding at at least one radius less than 2 μm from said interface is less than 50%.

33. An optical fibre as claimed in claim 32, wherein the cladding comprises an outer annular layer having a substantially constant coefficient of thermal expansion throughout its thickness and the difference in said substantially constant coefficient of thermal expansion and the coefficient of thermal expansion of the cladding radially inwardly of the outer layer but adjacent the outer layer is less than 50%.

34. An optical fibre as claimed in claim 33, wherein the coefficient of thermal expansion of said cladding varies gradually between adjacent said outer layer and said at least one radius in a stress relieving annular layer of said cladding between said outer layer and said core.

35. An optical fibre as claimed in claim 34, wherein said stress relieving annular layer contains thermal expansion modifying dopant present in an amount which increases from the radially outer region to the radially inner region thereof.

36. An optical fibre as claimed in claim 35, wherein said stress relieving annular layer contains a refractive index modifying dopant present in an amount which increases from the radially outer region to the radially inner region thereof to compensate for the refractive index modifying effect of the thermal expansion modifying dopant, whereby the refractive index of the annular stress relieving layer is substantially constant throughout its thickness.

37. An optical fibre as claimed in any one of claims 32 to 36, wherein said cladding comprises an annular barrier layer immediately adjacent the core for providing a barrier for diffusion of dopants between the core and the remainder of the cladding radially outwardly of the barrier layer.

38. An optical fibre having an NA higher than 0.2 comprising a silica core doped with at least one dopant from the group consisting of $GeO_2$, $Al_2O_3$ and $P_2O_5$ and surrounded with a cladding, an outer annular layer of said cladding consisting essentially of silica and having a first coefficient of thermal expansion value, the core having a second coefficient of thermal expansion value, and the cladding having an annular stress relieving layer between said outer layer and said core which stress relieving layer has a coefficient of thermal expansion which varies radially inwardly from a third value to a fourth value, the third value being closer to the first value than the second value and the fourth value being closer to the second value than the first value.

39. An optical fibre as claimed in claim 38, wherein the first and third values are substantially the same and the second and fourth values are substantially the same.

40. An optical fibre as claimed in claim 38 or 39 comprising an annular barrier layer between said core and said stress relieving layer for providing a barrier for the diffusion of dopants between said core and stress relieving layer.

41. An optical fibre as claimed in claim 38, wherein the maximum radial thickness of the barrier layer is less than or equal to 0.22 $(\alpha_c \cdot r_c)/\alpha_b$, where $\alpha_c$ is the coefficient of thermal expansion of the core, $\alpha_b$ is the coefficient of thermal expansion of the barrier layer, and $r_c$ is the radius of the core.

42. An amplifier as claimed in claim 15, wherein the content of $F_2$ increases from about 0 mol % at said radially outer region to about 3.5 mol % at said radially inner region.

43. An amplifier as claimed in claim 16, wherein the content of $F_2$ increases from about 0 mol % at said radially outer region to about 4 mol % at said radially inner region.

* * * * *